United States Patent [19]
Bisbee et al.
[11] 4,370,840
[45] Feb. 1, 1983

[54] INSULATION ANCHOR

[75] Inventors: Charles B. Bisbee, Newton Square, Pa.; Richard J. Yost, Medford Lakes, N.J.

[73] Assignee: Combustion Engineering, Inc., Windsor, Conn.

[21] Appl. No.: 188,802

[22] Filed: Sep. 19, 1980

Related U.S. Application Data

[63] Continuation of Ser. No. 86,981, Oct. 22, 1979, abandoned.

[51] Int. Cl.[3] .......... E04B 1/62; F16B 21/04

[52] U.S. Cl. .......... 52/410; 52/506; 52/632; 403/393

[58] Field of Search .......... 52/506, 698, 632, 713, 52/410, 365, 513, 678; 411/510, 383, 385, 745, 482; 403/393, 274; 249/42, 40, 213; 248/70, 298

[56] References Cited

U.S. PATENT DOCUMENTS

| | | | |
|---|---|---|---|
| 2,235,255 | 3/1941 | Durant | 403/274 |
| 2,879,660 | 3/1959 | Reintjes | 52/509 |
| 3,523,395 | 8/1970 | Rutter | 52/410 |
| 4,248,023 | 2/1981 | Dunlap | 52/506 |
| 4,289,415 | 9/1981 | Fishinger | 403/393 |

FOREIGN PATENT DOCUMENTS

| | | | |
|---|---|---|---|
| 690564 | 7/1964 | Canada | 403/393 |

*Primary Examiner*—John E. Murtagh
*Attorney, Agent, or Firm*—Richard H. Berneike

[57] ABSTRACT

An anchor assembly for supporting an insulation panel or blanket on furnace walls which includes an extension member adapted to be fastened to an existing anchor member in order to extend the length of the anchor assembly to accommodate insulation of greater thickness. The extension member has attaching means which engage notches in the existing anchor to hold to extension in position. Different species of the attaching means are disclosed.

2 Claims, 5 Drawing Figures

INSULATION ANCHOR

This is a continuation of application Ser. No. 86,981 filed Oct. 22, 1979, now abandoned.

BACKGROUND OF THE INVENTION

The present invention relates to an anchor for supporting panel members on walls of structures and, more specifically, to anchor assemblies for supporting insulating panels and blankets to the walls of refractory furnaces.

The walls of refractory furnaces are lined with insulating material which is often in the form of panels or blankets. It is necessary to provide anchor means for retaining these panels or blankets on the surfaces.

One of the more common methods of anchoring the insulation is by means of a stud which is welded to the furnace wall with the insulation being impaled over the stud and with a retaining clip placed over the stud and locked into position. Such an arrangement is shown in U.S. Pat. No. 3,738,217. It is obvious that such studs can be made any length desired but it is the common practice for economic and other reasons to make them only slightly in excess of the minimum length required to retain insulation of the specified thickness. Therefore, if it is desired to increase the thickness of the insulation, the studs which are already in place cannot be used in their existing form. With the increased cost of fuels, it is becoming economically justifiable to increase the thickness of insulation in existing furnaces. The present invention deals with the problem of using existing studs and increasing their length so as to accommodate a greater thickness of insulation.

SUMMARY OF THE INVENTION

The present invention relates to an anchor assembly for supporting an insulating panel or blanket member which includes an extension member which is fastened to an existing anchor which is fastened to the furnace wall in order to extend the length of the anchor assembly. More specifically, the present invention relates to such an assembly wherein the means for attaching the extension to the existing anchor include means which engage notches in the existing anchor.

DESCRIPTION OF THE PREFERRED EMBODIMENT

Figure 1:
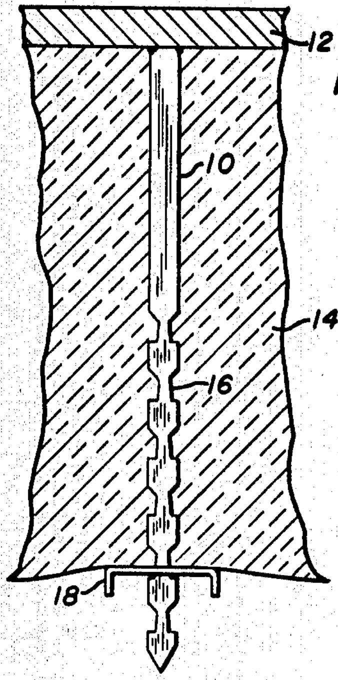
FIG. 1 PRIOR ART
FIG. 1 is a partial sectional view of an anchor assembly of the prior art in assembled position.

FIG. 1 illustrates an anchor 10 which is welded at one end to the wall 12 of the structure to be lined such as a furnace wall. The stud 10 is normally welded to the wall by means of the conventional stud welding technique. After the stud is welded in place, a panel or blanket of lining material 14 is forced over the stud against the wall 12. The length of the stud 10 is dimensioned so that a portion of the stud will always extend from the thickest portion of the material 14 that is expected to be encountered.

Figure 2:
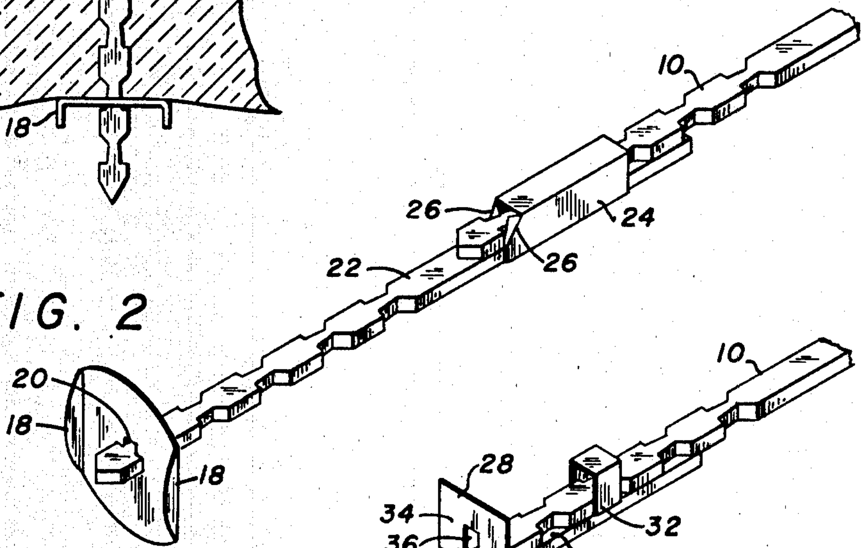
FIG. 2 is an isometric view of a portion of the anchor shown in FIG. 1 incorporating the extension of the present invention.
Figure 3:
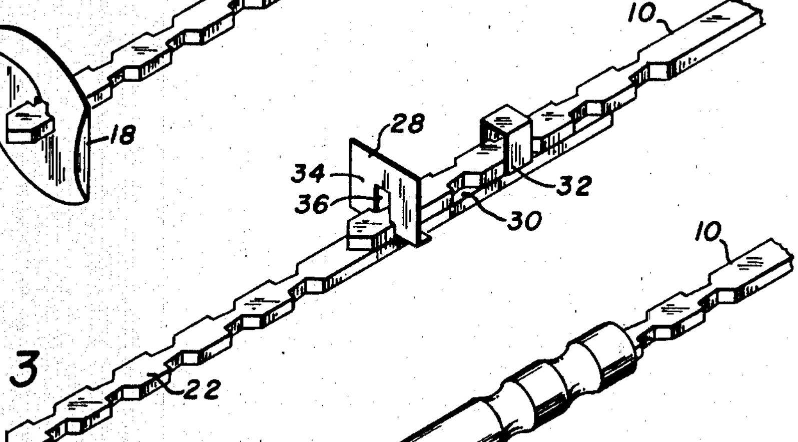
FIGS. 3 and 4 are isometric views similar to FIG. 2 illustrating two modified forms of the present invention.
Figure 4:
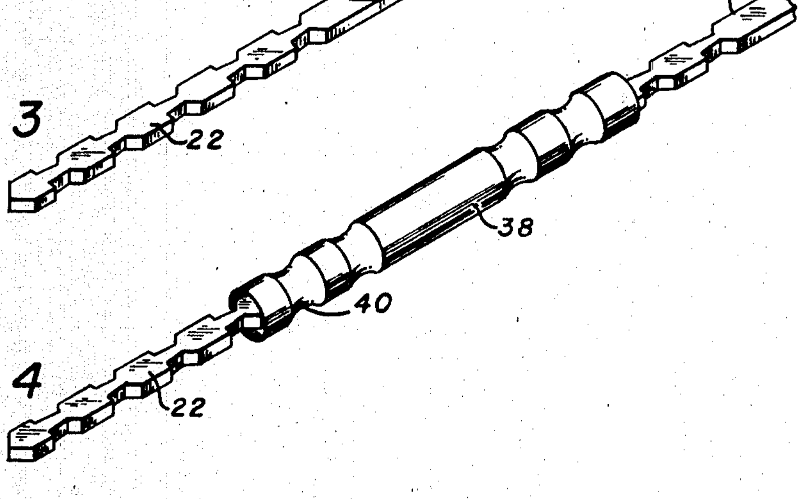

The stud 10, as best seen in FIGS. 2 to 4, is substantially rectangular in cross section and has one pair of opposed sides narrower than the other pair. A plurality of opposed notches 16 are disposed along the end of the stud opposite its welding end. The notches 16 are cut into the narrower sides of the stud.

The anchor assembly includes a substantially flat clip 18 formed of a relatively thin sheet material of thickness substantially less than the longitudinal length of the notches. The surface area of the clip 18 is designed such that it will have proper bearing on the lining material to support the material without breaking into the surface of the lining. The clip 18 includes an aperture 20 therein which is of configuration complimentary with but slightly larger than the unnotched portions of the stud 10. This aperture 20 can be seen in FIG. 2 with the clip 18 in position over the stud extension. During assembly, the clip 18 is pushed over the stud until the proper compression has been applied to the lining. When this point has been reached, the clip 18 will then be rotated through 90 degrees in the pair of opposed notches at this location into the locked position which is shown in FIG. 2. For more details about the construction of this particular type of stud, the notches therein and the clip for use with the stud, reference is made to previously mentioned U.S. Pat. No. 3,738,217.

Figure 5:
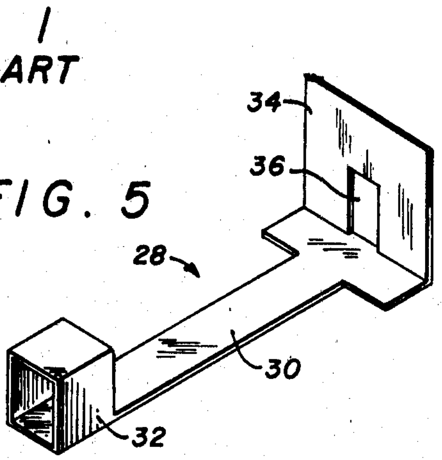
FIG. 5 is a more detailed isometric view of the fixture which is used in the embodiment of FIG. 3.

Referring now to the present invention as illustrated in FIGS. 2, 3 and 5, a stud extension 22 is attached to the existing stud 10 by means attached to the stud 22 which interlock with the notches on the stud 10. Referring specifically to the arrangement shown in FIG. 2, a square tube 24 is slipped over the stud extension 22 and spot welded in place. The square tube 24 thus forms an opening which is slipped over the existing stud 10. The tube 24 has tabs 26 formed thereon by providing a cut-out portion in the top and bottom portion of the tube. These tabs 26 are bent inwardly as shown in FIG. 2 after locating the stud 22 on the stud 10 such that the tabs 26 engage the notches on the stud 10. The tabs 26 will then hold the stud extension 22 in position with respect to the existing stud 10.

The arrangement shown in FIG. 3 illustrates a modification of the means for attaching the stud extension 22 to the existing stud 10. This comprises a fixture 28 which is also shown in FIG. 5. This fixture 28 includes a base 30 which is attached to the extension stud 22 such as by spot welding. Formed integral with or attached to the base 30 is a loop 32 which is slipped over the existing stud 10 as shown in FIG. 3. At the other end of the base 30 is a plate 34 which also may be formed integral with the base or attached thereto such as by welding. A rectangular opening 36 is formed in this plate 34. This opening 36 is of a configuration complimentary with but slightly larger than the unnotched portions of the existing stud 10 whereby the fixture may be inserted over the stud 10 when the fixture is turned sideways such that the stud 10 will protrude through the opening 36. When the stud extension 22 is in its desired location, the stud 22, together with the fixture 28 attached thereto, is rotated into the position shown in FIG. 3 so that the plate 28 will then engage the notches in the stud 10 and retain the extension in position. In order to accomplish this, the sort dimension of the opening 36 is less than the width of the stud 10 but slightly greater than the width of the notches such that the fixture may be rotated so as to engage the notches. After the stud 22 together with the fixture 28 are in position and have been rotated to the locked position, the plate 34 may be bent down flat against the stud 10 so as to prevent rotation of the stud 22 to an unlocked position.

FIG. 4 illustrates yet another embodiment of the present invention employing a further modified means for attaching the stud extension 22 to the existing stud 10. This comprises a tube 38 which is attached to the stud 22 by swaging or crimping the tube 38 as shown at 40 around the entire circumference of the tube at one or more locations corresponding to the location of the notches in the stud 22. The tube is, thus, crimped down into the notches which serves to hold the tube and stud together. The tube 38 is then placed over the existing stud 10 and likewise crimped or swaged into the notches in the stud 10. As an alternative or even preferred method, the open end of the tube 38 is swaged or crimped at the same time that the tube is attached to stud 22. The tube and stud assembly 38 and 22 can then be driven onto the existing stud 10 so that a force fit is obtained.

We claim:

1. A high temperature insulating construction wherein a first metallic stud is attached at one end thereof to a structural supporting member and is disposed essentially perpendicular to the surface of the structural supporting member, said first metallic stud having at least two anchor-engaging notches spaced along the length thereof, the improvement comprising:

a. a second metallic stud having at least one anchor-engaging notch, a portion of said second metallic stud overlapping a portion of said first metallic stud and the remaining portion of said second metallic stud extending outwardly from the end of said first metallic stud essentially perpendicular to and away from said structural supporting surface, b. means attached to said second metallic stud comprising:

i. a tube portion slidably encircling at least a portion of said overlapping portion of said first metallic stud whereby said second metallic stud and said attached tube portion may be slidably located in a desired position along the length of said first metallic stud, ii. a notch-engaging portion including a tab, said tab being bent into engagement with one of said anchor-engaging notches on said first metallic stud to retain said second metallic stud in a selected position with respect to said first metallic stud; and c. anchor means positioned on said second metallic stud and engaging an anchored-engaging notch thereon whereby a body of insulating material greater in thickness than the length of said first metallic stud is superimposed over the structural supporting member and is pierced by said first and second metallic studs and retained thereon by said anchor means on said second metallic stud.

2. An insulating construction as recited in claim 1 wherein said tube is welded to said second metallic stud.

* * * * *